F. MÜLLER.
METHOD OF MAKING MILLING CUTTERS.
APPLICATION FILED JAN. 13, 1919.
1,348,303.
Patented Aug. 3, 1920.
4 SHEETS—SHEET 1.
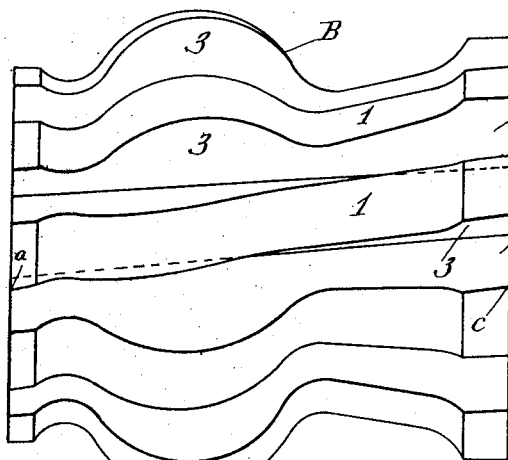
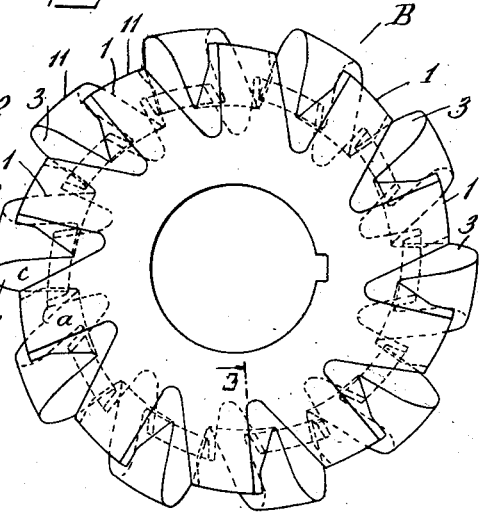
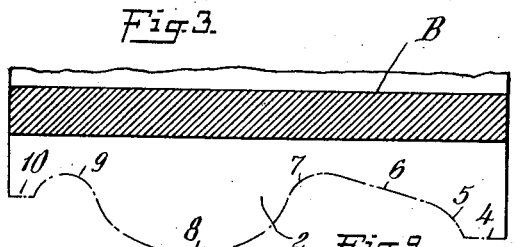
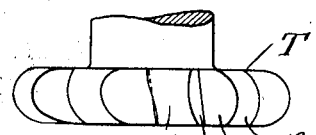
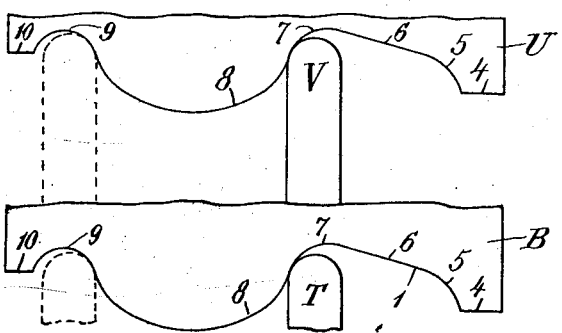
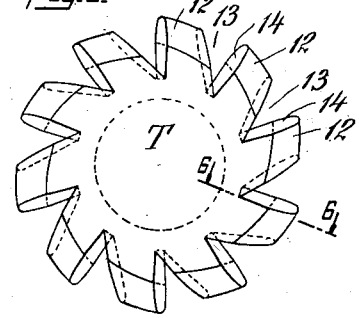
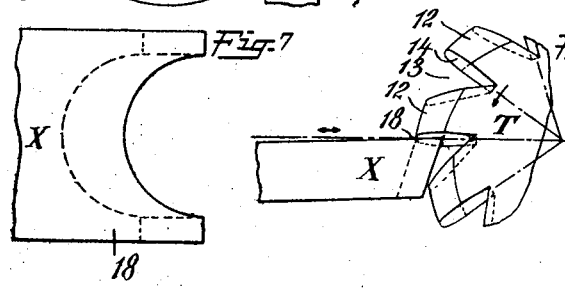
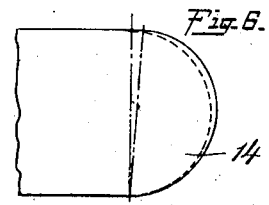
Inventor
Friederich Müller
By S. Jay Teller
Attorney

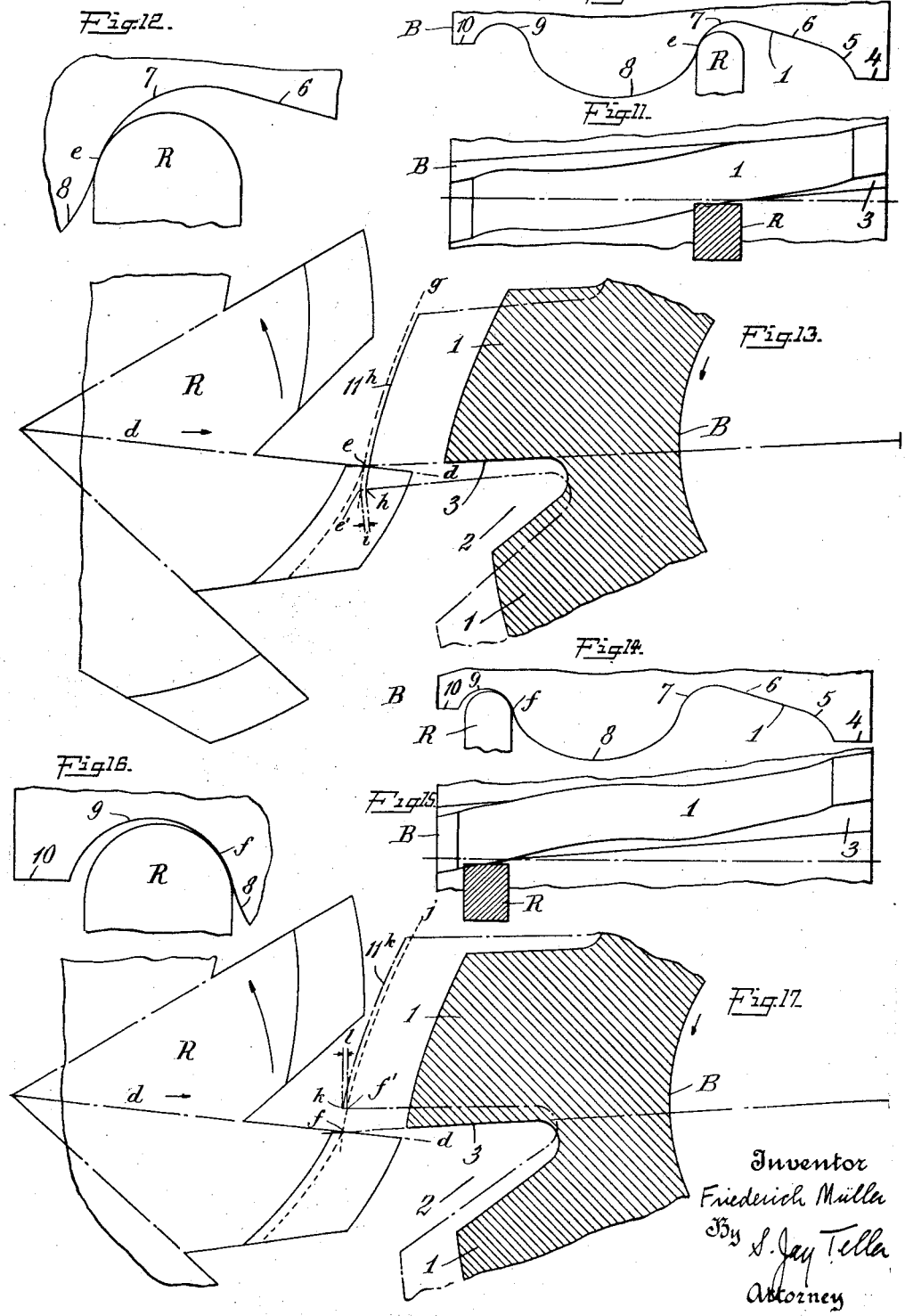

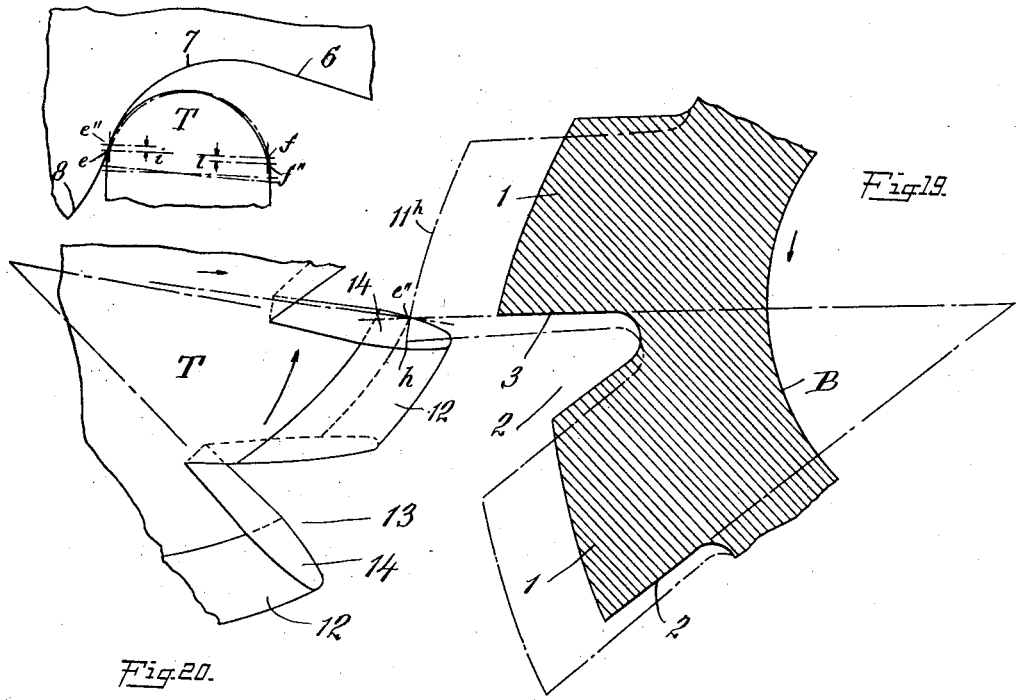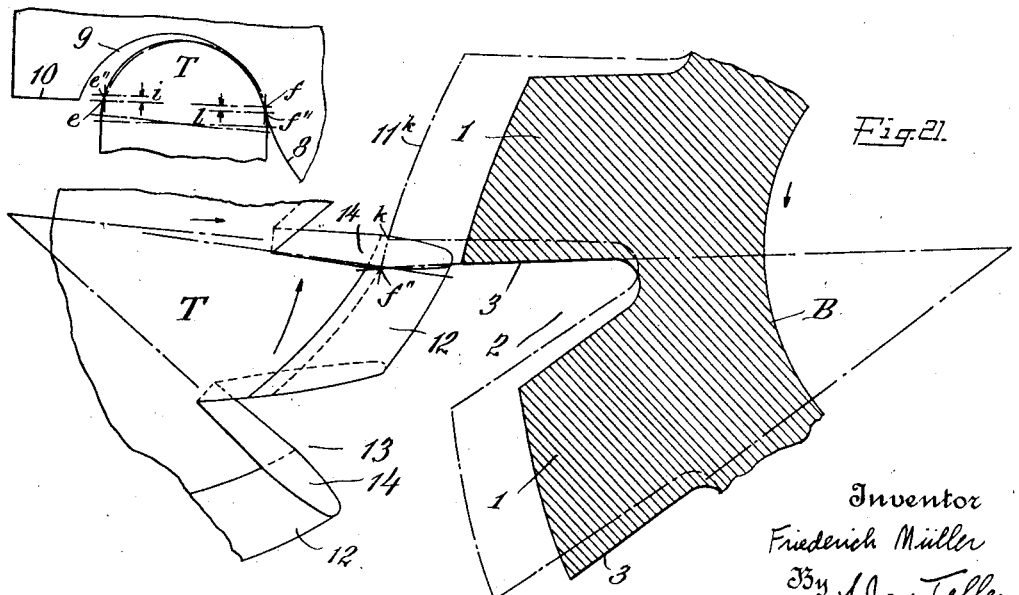

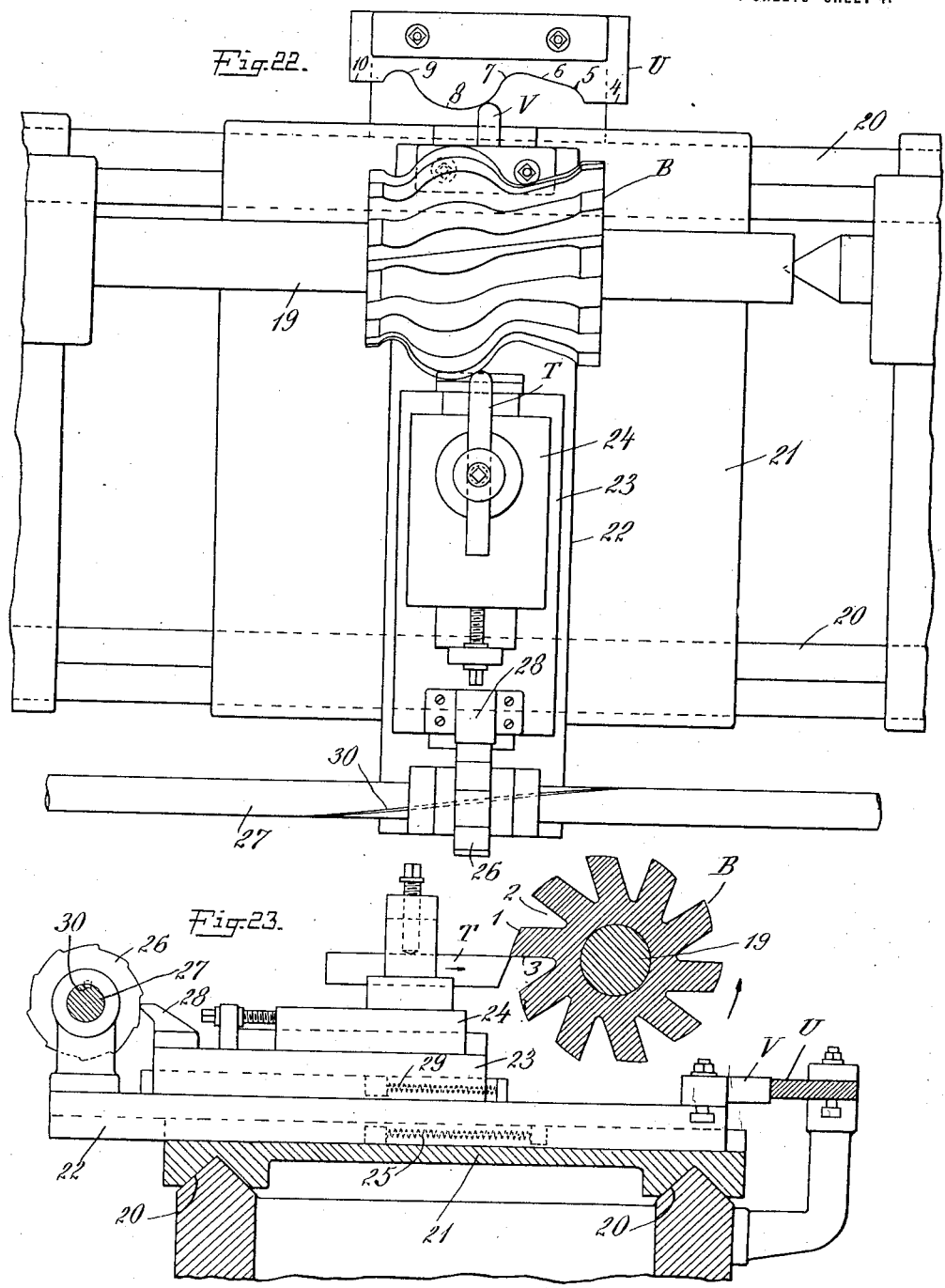

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING-CUTTERS.

1,348,303.	Specification of Letters Patent.	Patented Aug. 3, 1920.

Application filed January 13, 1919. Serial No. 270,942.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling-Cutters, of which the following is a specification.

It is a well known principle in the art of cutting metals that the cutting edge of the tool should preferably be inclined with respect to the direction of relative movement so as to effect a shearing cut. This inclination is of advantage in that it improves the cutting action and it is also of advantage in that it permits the tool to engage the work gradually and with relatively little shock instead of engaging it suddenly with greater shock. This principle has been applied to relieved milling cutters which are of uniform diameter throughout and has also been applied to milling cutters having a uniform taper from one end to the other. These milling cutters have their cutting edges longitudinally inclined with respect to the axis, the cutting edge usually approximately conforming to a helix. Thus each tooth is enabled to engage the work gradually and to effect a shearing cut.

I have applied this principle to accurately made and properly relieved formed or contour cutters. By a formed or contour cutter I mean one in which the diameter varies from end to end in ways differing from a uniform taper, the cutter being thus adapted to cut a predetermined contour other than a straight line. Prior to my invention it had not been deemed practical or possible to make such cutters with inclined cutting faces. The said invention is presented and claimed in my copending application for milling cutters, Serial No. 268,349, filed December 26th, 1918.

In my copending application for methods of making milling cutters, Serial No. 268,350, filed December 26th, 1918, and in my copending application for methods of making milling cutters, Serial No. 248,190 filed August 3rd, 1918, I have presented two methods of making cutters embodying the invention set forth in my said application Serial No. 268,349. In accordance with the method disclosed in the first said application, Serial No. 268,350, the cutter is formed by means of a preliminary milling cutter or a preliminary lathe tool made with a contour corresponding to that to be formed on the final cutter. The preliminary milling cutter or lathe tool engages the cutter from one end to the other and it is therefore necessary for the teeth of the cutter to be far enough apart to enable the preliminary tool to finish one tooth before engaging the next tooth. In accordance with the method disclosed in the second said application Serial No. 248,190, I avoid the limitations which are incident to the method set forth in the first application The cutter may have the forward outer corner of each tooth overlapping the opposite rear outer corner of the next tooth. The method involves the use of a fine pointed lathe tool which is guided to follow the desired contour and thus cut the said contour on the cutter.

In my copending application Serial No. 270,941, filed on even date herewith, I have presented a method somewhat similar to that presented in my last said application, Serial No. 248,190, differing, however, in that a relatively broad tool is used instead of a pointed tool. Use is made of the same principle that is used in the method presented in my said application Serial No. 268,350, and two forms of the method are disclosed. In one instance the preliminary milling cutter is used to form a lathe tool which is used for cutting the final cutter, and in the other instance the preliminary milling cutter is used directly for milling the final cutter. The present application relates specifically to the second form of the said method involving the use of the preliminary cutter directly for milling the final cutter.

As to a part of its subject matter this application constitutes a continuation of my abandoned application for methods of making milling cutters, Serial No. 248,191, filed August 3rd, 1918.

In order that the method may be clearly understood, I have shown in the accompanying drawings a cutter embodying the invention set forth in the aforesaid application Serial No. 268,349. It will be understood, however, that the drawings are for illustrative purposes only and are not to be construed as defining or limiting the scope of the invention, the accompanying claims being relied upon for that purpose. It will be particularly understood that the contour of the cutter shown has been selected merely by way of example and that any practical contour may be substituted for that illustrated.

Of the drawings:

Figures 1 and 2 are side and end views respectively of the cutter such as may be made in accordance with the invention.

Fig. 3 is a developed fragmentary cross sectional view, the section being taken through the bottom of one of the longitudinal grooves along a helicoidal surface such as 3—3 indicated in Fig. 2.

Figs. 4 and 5 are plan end views respectively of a preliminary milling cutter which may be used for milling the final cutter shown in Figs. 1 and 2.

Fig. 6 is an enlarged diagrammatic view illustrating certain features of the cutter shown in Figs. 4 and 5.

Fig. 7 is an enlarged plan view of a lathe tool adapted to be used for shaping the preliminary milling cutter.

Fig. 8 is a diagrammatic view illustrating a method of shaping the preliminary milling cutter, use being made of the lathe tool shown in Fig. 7.

Fig. 9 is a diagrammatic plan view illustrating the general method that is followed.

Fig. 10 is a diagrammatic plan view illustrating one step of an incorrect method. A preliminary cutter is shown in engagement with a cutter blank.

Fig. 11 is a front view of one tooth of the final cutter as shown in Fig. 10.

Fig. 12 is an enlarged plan view of the preliminary cutter and adjacent parts shown in Fig. 10.

Fig. 13 is a diagrammatic cross sectional view illustrating the relationship between the preliminary cutter and the final cutter.

Fig. 14 is a view similar to Fig. 10 but showing the preliminary cutter in a different position.

Fig. 15 is a front view of one tooth of the final cutter as shown in Fig. 14.

Fig. 16 is an enlarged plan view similar to Fig. 12 but showing the preliminary cutter in the position illustrated in Fig. 15.

Fig. 17 is a view similar to Fig. 13 but showing the preliminary cutter and the final cutter in the position illustrated in Fig. 16.

Figs. 18 to 21 are views corresponding respectively to Figs. 12, 13, 16 and 17 but showing the preliminary cutter formed as shown in Figs. 4 to 8.

Fig. 22 is a diagrammatic plan view of a machine adapted for carrying out the method.

Fig. 23 is a cross sectional view of the machine illustrated in Fig. 22.

In order that the method involving the invention may be clearly understood, I will first describe a cutter such as may be made in accordance therewith. Referring to the drawings, particularly to Figs. 1 to 3 thereof, it will be seen that I have shown a cutter B which is shaped to cut a predetermined contour differing from a straight line. The cutter is provided with a plurality of generally longitudinal teeth 1 between which are grooves 2, the teeth and grooves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face must be radial or approximately so in order to provide a satisfactory cutting angle. Each cutting face 3 is inclined or positioned obliquely so that its longitudinal lines lie at angles to the axis of the cutter. Preferably, as shown, the entire teeth 1 are oblique or inclined, and not merely the front cutting faces 3 thereof. As concerns the broader phases of the invention, I do not narrowly limit myself in regard to the nature of the inclination of the teeth 1 or in regard to the character of the front walls or cutting faces 3, but preferably each tooth 1 is generally helical in form and each cutting face 3 conforms to a helicoid. As illustrated in Figs. 1 and 2 the helicoid is one formed by a generatrix following the axis of the cutter and also following a helix on a cylinder concentric with the axis thereof, the helicoid in this case being radial. The character of the helicoid may, however, be varied. The teeth and the cutting faces may be inclined in either direction and the degree of inclination may be varied as required.

The cutter B may be made for cutting any desired practical contour. The contour may be made up of a series of straight lines, or a series of circular arcs, or a combination of circular arcs and straight lines, or the contour may consist in whole or in part of non-circular curves. The cutter shown in Figs. 1 and 2 is adapted for cutting the contour shown in Fig. 3, this contour consisting of a straight section 4 parallel with the axis, a concave section 5 in the form of a circular arc, a straight section 6 inclined with respect to the axis, a concave section 7 in the form of a circular arc, a convex section 8 in the form of an elliptical arc, a concave section 9 in the form of a circular arc, and a straight section 10 parallel with the axis. The grooves 2 can be of any usual or preferred depth or shape as required by the spacing and by the depth of the contour. As illustrated in Fig. 3, each groove 2 has a uniform depth throughout; that is, its bottom is parallel with the axis of the cutter.

The outer edge of each cutting face 3 has an outline which is shaped to cut the predetermined contour when the cutter is rotated, this outline of the cutting face following the helicoidal surface thereof. All points along the outline must be at their respective correct distances from the center so that when the cutter is rotated they will define the correct predetermined contour. This relationship of the several points along the outline of the cutting face must obtain notwithstanding the fact that the cutting face is a warped or helicoidal surface.

Each tooth of the cutter B is relieved along lines 11 extending backward and inward from the outline of the cutting face, these relief lines forming a continuous surface or continuous surfaces which extend from end to end of the cutter and which are properly constructed notwithstanding the variations in radius at different points along the said outline and notwithstanding the variations in angular position resulting from the warped or helicoidal cutting face. Preferably the relief lines 11 are maintained in similar relationship to each other as they extend backward and inward, the lines preferably conforming to spirals of Archimedes. The result is that each tooth of the cutter, at any axial plane of intersection, has a distorted shape, the distortion of shape resulting from the fact that the successive inward inclined relief lines 11 start at different angular positions because of the inclined or helicoidal cutting face. Notwithstanding this distortion in shape at an axial plane of intersection, the outline or effective contour at the cutting face is correct, as before stated.

When the relief lines 11 conform to spirals and are maintained in similar relationship as they extend backward and inward, as is preferred, it is possible to sharpen or grind the teeth of the cutter on the front cutting faces 3 without changing the effective contour. The teeth present the same effective contour at successive inclined surfaces of intersection similar in form and position to the initial cutting faces 3. At any surface, back of an initial cutting face 3 and similar to the said face, the same effective contour will be found. Therefore if the cutter is ground on the front faces to helicoids which are the same as the helicoids of the initial cutting faces the effective contour will remain the same.

With a relatively long contour such as that shown and with the teeth relatively closely spaced, overlapping occurs to a greater or less extent. The forward outer corner $a$ of each tooth overlaps the opposite rear outer corner $c$ of the next preceding tooth. This overlapping may be even greater than that shown when there is a longer contour, or when there is a greater degree of inclination, or when the teeth are more closely spaced.

The present invention relates to a method of making a cutter such as that set forth and this method will now be described. It will be understood that the preliminary steps of turning the blank and cutting the grooves therein can be carried on in any usual or preferred way, these not of themselves constituting any part of the invention. The invention relates particularly to the method of shaping the blank to properly form and relieve the helical teeth so that they will cut a correct contour.

In my said application Serial No. 248,190 I have described a method involving the use of a narrow lathe tool for shaping the final cutter. While a narrow tool has many features of advantage it may sometimes be preferable to use a wider tool and this tool may be a rotating milling cutter such as T shown in Figs. 4 to 6.

In practising the method the cutter T is held in operative relationship with a blank B, as shown in Fig. 9, and is fed and guided, preferably toward the left, so as to follow the true contour 4—10. During the cutting operation the blank is axially rotated by any preferred means. The tool is preferably held in parallelism while being fed, and the feeding is preferably effected uniformly from one end of the blank to the other. For guiding the tool there is provided a former U having exactly the predetermined contour to be cut by the cutter B. The former is engaged by a pin V which has the same or approximately the same front outline as the tool, the shape of the pin as shown being exactly half-round or semi-circular. The former pin is connected with the tool for longitudinal movement in unison therewith. In order that the teeth of the cutter may be properly relieved, the tool or cutter is reciprocated toward and from the blank axis in timed relation to the blank rotation. To enable the tool to properly cut the relief in accordance with the inclined helicoidal cutting face, the relative timing of the tool reciprocations is varied in exact proportion to the longitudinal movement of the tool. In this way the tool is so controlled that it always assumes the correct position to engage the edge of a tooth notwithstanding the relative position of the edge is different at different points along the length of the cutter. Fig. 9 shows two different positions of the cutter and former pin.

The cutter T is formed by following a method which is in some respects similar to the method set forth in my aforesaid copending application Serial No. 268,350. Reference can be had to the said application for details and for possible variations not herein set forth.

The cutter T is provided with teeth 12 having grooves 13 between them. The teeth are so formed as to have a suitable concave preferably semi-circular shape at an axial plane of intersection such as 6—6, as shown by dotted lines in Fig. 6. The front or cutting faces 14 of the teeth 12 are helicoidal in form, and are inclined in the same direction as the cutting faces 3 of the final cutter. The helicoidal faces are preferably constructed with the same longitudinal pitch as the helicodial faces 3 of the final cutter B. The cutter T is smaller in diameter than the final cutter B and therefore the actual inclination of its cutting faces 14 is somewhat less than the inclination of the cutting faces 3, but the cutting faces of both cutters nevertheless conform to similar helicoids; that is, the helicoids having the same longitudinal pitch. Similarly, the cutter T is provided with the same degree of relief as that of the final cutter B. Because of the smaller diameter of the cutter T, the actual angle of relief is somewhat greater, but it nevertheless corresponds to similar spirals. The cutter T, constructed as shown and described, has an effective contour shown by full lines in Fig. 6 which is different from the true semi-circular contour.

The preliminary cutter T can most conveniently be made by means of a lathe tool such as X, shown in Figs. 8 and 9. The tool X is provided at its top cutting face 18 with a concave shape, as shown in Fig. 8, which is exactly the same as the convex shape of the former pin V. The tool X is used in a relieving lathe and it is set with its top cutting face in a plane at an angle to a plane through the axis of the cutter, as shown in Fig. 9. When the cutter is being formed it is rotated in the direction of the arrow, the tool X being moved in and out, as indicated by the horizontal arrow, so as to follow the proper relief lines.

It has already been stated that the variation in the timing of the relieving movements of the tool occurs in exact proportion to the longitudinal movement of the tool along the contour. With a very narrow tool or cutter it may be assumed that the cutting point is fixed with respect to the tool and is at the central plane thereof. But with a cutter such as T of considerable width, the cutting point will not be always at the center of the tool and may be at one side or the other thereof in accordance with the shape of the contour to be cut.

Figs. 10 and 11 show diagrammatically a cutter R having an effective contour which is half-round and exactly the same as that of the former pin V. In this view the cutting point is at $e$ at the left-hand side of the center. Figs. 14 and 15 are similar views and they show the cutting point at $f$ at the right-hand side of the center. It will be seen that for other positions of the cutter the cutting point would be still differently located, in fact, shifting to different positions on one side and from side to side as the inclination of the contour changes. The variation in the timing of the reciprocating relieving movements takes no account of the shifting of the cutting point, and it is such that the cutting action is correct when the cutting point is at the center of the cutter, but is not correct when the cutting point is at one side or the other.

Fig. 12 is an enlargement of a part of Fig. 10, and Fig. 13 is a diagrammatic cross sectional view on the same scale as Fig. 12, the cutting point being at $e$. The milling action can be considered as taking place along a plane $d$—$d$, as indicated. The shape of the teeth of the final cutter is determined as they pass the said plane $d$—$d$. The plane is at an angle to a plane through the axis of the cutter B, but the correction shown in Figs. 7 and 8 compensates for this.

The timing of the reciprocating movements is such as to bring the cutter R into its outer position when the central point of the cutter is opposite the cutting edge, as shown by the full line section in Fig. 13. The dotted line section in Fig. 13 is taken through the point $e$ and shows that the front face of the tooth reaches the cutting plane $d$—$d$ too soon, and that therefore the cutter starts to cut too soon at $e'$ and does not reach its normal starting position until after the front face of the tooth has passed. The result is that the tooth is cut with a relief line $e'$—$g$ which is too high instead of with a correct relief line $11^h$ having a point $h$ at the correct distance from the center of the cutter. The amount of error measured radially is indicated by $i$.

Fig. 16 is an enlargement of a part of Fig. 14 and Fig. 17 is a diagrammatic cross sectional view on the same scale as Fig. 16, the cutting point being at $f$. This view is similar to Fig. 13. The timing of the reciprocating movements is such as to bring the cutter R into its outer position when the central point of the cutter is opposite the cutting edge, as shown by the full line section in Fig. 17. The dotted line section in Fig. 17 is taken through the point $f$ and shows that the front face of the tooth does not reach the cutting plane soon enough. The cutter cannot start to cut to its full depth until the front face of the tooth reaches the plane $d$—$d$, at which time the cutter has moved inward to bring the point $f$ to the position $f'$. The result is that the tooth is cut with a relief line $f'$—$j$ which is too low instead of with a correct relief line $11^k$, having a point $k$ at the correct distance from the center of the cutter. The amount of error measured radially is indicated by $l$.

It will be understood that similar errors occur at all positions of the cutter except where the cutting point is at the center of the cutter. The errors vary in extent in accordance with the inclination of the contour at various points and the result is that an erroneous contour is formed instead of a correct one.

The errors which would arise from the use of a cutter such as R exactly the same in effective contour as the former pin V are avoided by use of the cutter T formed as already described. In using the cutter T the same half-round former pin V is retained.

Figs. 18 to 21 correspond respectively to Figs. 12, 13, 16 and 17, the only difference being that the cutter T has been substituted for the cutter R. In Figs. 18 and 20 the half-round shape of the cutter R is shown by dot-and-dash lines. The cutting points $e$ and $f$ of the cutter R are indicated and also the corresponding cutting points $e''$ and $f''$ of the cutter T. It will be observed that the point $e''$ is farther in toward the axis by the distance $i$ thus correcting the error indicated in Fig. 13, and that the point $f''$ is farther in by the distance $k$ thus correcting the error indicated in Fig. 17.

It will be unnecessary to enter into a detailed description of Figs. 18 to 21 and it will be sufficient to point out that on account of the corrected shape of the cutter T the cutting point $e''$ is at the proper position to engage the tooth at the point $h$ and to cut the correct relief line $11^h$ on the cutter tooth, as shown in Fig. 19. Similarly the cutting point $f''$ is at the proper position to engage the tooth at the point $k$ and to cut the correct relief line $11^k$ on the cutter tooth, as shown in Fig. 21.

In practising the invention, use may be made of a machine in some respects similar to that set forth in my copending application for relieving machines, Serial No. 286,524, filed March 31, 1919. The machine is not claimed as a part of the present invention, but in order that the method may be more clearly understood I have illustrated diagrammatically in Figs. 22 and 23 the essential parts of a machine for carrying out the method. It will be understood that, so far as this invention is concerned, the machine construction can be widely varied. As illustrated, 19 is a mandrel upon which is carried a cutter blank B. Suitable means are provided for supporting and rotating the mandrel. Longitudinally movable along ways 20, 20 is a carriage 21 upon which is mounted a transversely movable slide 22. Carried by the slide 22 is an independently movable transverse slide 23 which carries the cutter T. There is preferably an intermediate slide 24 by means of which preliminary adjustments of the cutter may be effected. Secured to the slide 22 is the former pin V which has already been described. Secured to the main frame of the machine is the former plate U. A spring 25 is provided for pressing the slide 22 toward the rear and thus holding the former pin V always in engagement with the former U. It will be seen that when the carriage 21 is moved longitudinally the slide 22 will be caused to move transversely under the guidance of the former, the tool T thus being caused to develop an outline which is exactly the same as that of the former U.

A cam 26 is splined to a shaft 27 which is rotatably mounted on the slide 22. The cam 26 and the shaft 27 are bodily movable in accordance with the transverse movements of the slide 22. When the slide 22 moves longitudinally with the carriage 21 the cam 26 moves along the shaft, the shaft itself being fixed against longitudinal movement. Thus the cam 26 partakes of all of the bodily movements of the slide 22. A finger 28 secured to the slide 23 engages the cam and a spring 29 is provided for pressing the slide 23 outward, thus holding the finger 28 against the cam. Suitable means, not fully shown, are provided for rotating the shaft 27 in timed relation with the mandrel 21, the shaft being given one complete rotation for each rotation of the blank B. Thus the cutter T is reciprocated. In order to effect the aforesaid variation in the timing of the relieving movements, the groove or keyway 30 of the shaft 27 is helical in form and has the same degree of inclination, that is, the same longitudinal pitch, as the teeth of the blank B. The result is that when the cutter T is moved longitudinally of the blank the cam 26 is moved along the shaft 27. On account of the helical keyway the cam not only partakes of the normal rotative movement of the shaft but is given a supplemental rotative movement, this supplemental movement being exactly correct in amount to cause the cutter, when in its outermost operative position at each reciprocation, to engage the front edge of a tooth of the cutter.

In operation, a former U is selected having exactly the predetermined contour, and a former pin V is selected which has a cross sectional shape bearing the described relation to that of the cutter T that is to be used. A blank B is put in place, as shown, this blank having previously been roughed out and grooved in any usual or preferred way. By means of the slide 24 the cutter is adjusted into engagement with the blank at its right-hand end and the movement of the machine is started. The blank B rotates and the cutter is given a reciprocating movement to effect the relief. By means of the carriage 21 the cutter is fed slowly toward the left, the rotative movement of the blank and the reciprocating movement of the cutter being continued. By means of the former and the former pin, the slide 22 is moved inward and outward but, because the cam 26 is movable with the slide, the reciprocating relieving movements of the cutter T are continued without interruption. Inasmuch as the cam 26 moves longitudinally along the shaft 27 as the cutter is fed, the reciprocating relieving movements of the cutter are slightly accelerated, thus causing the cutter to engage the blank at the proper times notwithstanding the inclination of the cutting faces thereof.

The former U can have any desired practical contour, no matter how irregular, and thus any desired practical contour, no matter how irregular, can be given to the finished cutter B. It will be seen that in accordance with my invention it is possible to construct a cutter with any desired effective contour without the use of any specially constructed cutting tools. The same cutter T may be used for various contours, it being merely necessary to provide formers having the contours desired.

What I claim is:

1. The herein described method of shaping a spirally relieved milling cutter having helicoidal cutting faces adapted to cut a predetermined contour other than a straight line, the method consisting in axially rotating a blank having teeth with helicoidal front faces, in providing a former having the predetermined contour of the final cutter and a companion former pin having a predetermined convex shape, in providing a preliminary milling cutter having an effective shape different from that of the former pin but related thereto in a predetermined way, and in milling the contour of the relieved final milling cutter by means of the preliminary cutter, the cutter being guided by the said former and former pin to develop the predetermined contour and being reciprocated in timed but varying relation to the rotation of the blank to provide the required relief.

2. The herein described method of shaping a spirally relieved milling cutter having helicoidal cutting faces adapted to cut a predetermined contour other than a straight line, the method consisting in axially rotating a blank having teeth with helicoidal front faces, in providing a former having the predetermined contour of the final cutter and a companion former pin having a predetermined convex shape, in providing a preliminary milling cutter having an effective shape different from that of the former pin, the difference in shape being dependent on the degree of inclination of the cutting faces of the final cutter, and in milling the contour of the relieved final milling cutter by means of the preliminary cutter, the cutter being guided by the said former and former pin to develop the predetermined contour and being reciprocated in timed but varying relation to the rotation of the blank to provide the required relief.

3. The herein described method of shaping a spirally relieved milling cutter having helicoidal cutting faces adapted to cut a predetermined contour other than a straight line, the method consisting in axially rotating a blank having teeth with helicoidal front faces, in forming a preliminary milling cutter having a predetermined concave shape at axial planes of intersection and having its teeth provided with helicoidal cutting faces with a longitudinal pitch the same as that of the helicoidal cutting faces of the final cutter and provided with a degree of spiral relief the same as that of the teeth of the final cutter, in providing a former having the predetermined contour of the final cutter and a companion former pin having approximately the same shape as the said cross sectional shape of the preliminary cutter, and in milling the contour of the relieved final milling cutter by means of the preliminary cutter, the cutter being guided by the said former and former pin to develop the predetermined contour and being reciprocated in timed but varying relation to the rotation of the blank to provide the required relief.

In testimony whereof I hereto affix my signature.

FRIEDERICH MÜLLER.

It is hereby certified that in Letters Patent No. 1,348,303, granted August 3, 1920, upon the application of Friederich Müller, of Hartford, Connecticut, for an improvement in "Methods of Making Milling-Cutters," errors appear in the printed specification requiring correction as follows: Page 2, line 13, after the word "plan," insert the word *and;* page 4, line 15, for the article "the" read *to;* and that the said Letters Patent should be read with these corrections therein that the same may conform to the record of the case in the Patent Office.

Signed and sealed this 28th day of September, A. D., 1920.

[SEAL.]

M. H. COULSTON,
*Acting Commissioner of Patents.*

Cl. 26—101.